United States Patent [19]

Ran et al.

[11] Patent Number: 5,732,785

[45] Date of Patent: Mar. 31, 1998

[54] PROACTIVE EXTERIOR AIRBAG SYSTEM AND ITS DEPLOYMENT METHOD FOR A MOTOR VEHICLE

[75] Inventors: Bin Ran; Wenjing Huang, both of Madison, Wis.

[73] Assignee: Transmart Technologies, Inc., Madison, Wis.

[21] Appl. No.: 623,588

[22] Filed: Mar. 28, 1996

[51] Int. Cl.⁶ .................................................. B60D 1/28
[52] U.S. Cl. ........................ 180/271; 180/274; 280/728.1; 293/1
[58] Field of Search .......................... 180/271, 274; 280/728.1, 737; 293/1

[56] References Cited

U.S. PATENT DOCUMENTS

| | | | |
|---|---|---|---|
| 3,365,572 | 1/1968 | Strauss | 293/1 |
| 3,708,194 | 1/1973 | Amit | 280/737 |
| 3,822,076 | 7/1974 | Mercier et al. | 180/274 |

*Primary Examiner*—Kenneth R. Rice

[57] ABSTRACT

A proactive vehicle safety device, a proactive exterior airbag system, is disclosed, which consists of a detection subsystem, a control subsystem and a deployment subsystem. The design of each of the subsystems is provided. The detection method, control method and deployment method of the proactive exterior airbag system are also provided. Two types of exterior airbags are disclosed.

18 Claims, 6 Drawing Sheets

PROACTIVE EXTERIOR AIRBAG SYSTEM AND ITS DEPLOYMENT METHOD FOR A MOTOR VEHICLE

BACKGROUND OF THE INVENTION

1. Field of Invention

This invention relates generally to vehicle safety restraint devices, and more particularly this invention relates to a proactive vehicle safety system which proactively utilizes exterior airbag system to prevent collision or reduce collision damage based on proactive detection of collision and proactive control and deployment of exterior airbags. More specifically, this invention relates to the system design and deployment method of a proactive exterior airbag system.

2. Description of the Related Art

Currently, the interior airbag system is used to protect the driver and passengers inside a motor vehicle. This system is reactive and passive. It is deployed based on collision impact once a collision occurs. Thus, such a reactive safety restraint system cannot prevent the damage to the vehicle and the protection to the driver and passengers would be limited. Furthermore, the negative impact of interior airbag system has been reported because it would likely injure or kill children sitting in the front passenger seats while saving adults' lives.

Passive and collision impact-based exterior airbags have been proposed to protect the motor vehicle from collision damage—for example, in U.S. Pat. No. 3,822,076 to Mercier and LeFeuvre (1974) and U.S. Pat. No. 3,708,194 to Amit (1973). Mercier and LeFeuvre (1974) describes a fluid energy absorbing bag to be inflated against the collision detected by its probes mounted at the front of the vehicle. Amit (1973) describes an inflatable bag at the front of an automobile to provide a cushion for the vehicle and its passengers during a collision. But nevertheless, these inventions suffer from a number of significant disadvantages:

(a) These systems are reactive and passive. They are deployed based on collision impact once a collision occurs. However, once a collision occurs, it is usually too late to deploy exterior airbags to prevent collision or reduce the collision damage, because the collision energy cannot be effectively absorbed by the airbags due to the delay of deployment.

(b) No collision detection logic is used. Although Mercier et al uses probes as detectors, the system is still impact-based. It is not truly proactive collision detection.

(c) No proactive control and deployment systems and logic are proposed to proactively prevent collision.

(d) Mercier et al's system is not easy to be applied for real world. Because the physical probe detectors will need a lot of additional space and am fragile to be broken during parking and movement maneuvers.

A collision prevention means has been proposed for railroad trains—for example, in U.S. Pat. No. 3,365,572 to Strauss (1968). Strauss (1968) teaches to use continuous beam lasers at each end of a train to warn and control trains in order to prevent a collision. But nevertheless, this invention also suffers from a number of significant disadvantages:

(a) When a collision is unavoidable (in a dilemma zone), Strauss' system is not able to prevent the damage of the collision to the train or the vehicle and driver/passengers.

(b) It is extremely difficult for Strauss' system to be applied for motor vehicles. Because all trains are required to be equipped with Strauss' system simultaneously so as to send out laser light beams and receive signals. If one train is not equipped, the approaching of this train can not be detected by other trains. This problem poses a great difficulty for motor vehicles. Because the number of automobiles is huge and it is impossible to equip all vehicles at one time. Furthermore, the light beams are one directional and have narrow range in terms of receiving and detection. When a vehicle's path or roadway are zigzagging, Strauss' system cannot function or produce a lot of false alarms.

To cope with these problems, this invention proposes a proactive exterior airbag system which can deploy the exterior airbags before a collision occurs. Therefore, a significant portion of the collision energy can be absorbed by the fully deployed exterior airbag system. This proactive deployment method will fully utilize the exterior airbag system so as to overcome the disadvantages of the passive and impact-based exterior airbags. These exterior airbags are installed in the front, rear, side or corner of the vehicle. Such a proactive safety restraint device will actively protect the driver, passengers and vehicle itself from a collision in a less expensive and efficient way. Furthermore, such a proactive exterior airbag system will not hurt children, driver and other passengers as interior airbag does. Consequently, it could reduce the negative impact of interior airbag on children.

Furthermore, in Automated Highway Systems (AHS), the vehicle should be able to detect the relative distances and speeds between itself and surrounding vehicles or hazardous objects in real-time by using vehicle-to-vehicle communication and vehicle-to-roadside communication. This information can be used to more accurately predict when and which part of the vehicle will have collision with its neighboring vehicles or hazardous objects so that the proactive exterior airbag system can be deployed properly and more efficiently. By using this proactive exterior airbag system, less debris or flying objects (broken tires, bumpers, etc.) caused by collision will be produced on Automated Highway Systems so that the automated vehicles and automated highway can still operate after accidents.

For vehicles ranging from conventional vehicles to automated vehicles, similar proactive exterior airbag system can be designed and deployed to prevent collision of vehicles with vehicles or surrounding hazardous objects.

SUMMARY OF INVENTION

Accordingly, several objects and advantages of the prevent invention are:

(a) to provide a proactive vehicle safety device to avoid damage to vehicles, driver and passengers;

(b) to provide a proactive control and deployment method for the above-mentioned proactive vehicle safety device;

(c) to provide a proactive exterior airbag system, comprising a detection subsystem, a control subsystem, and a deployment subsystem;

(d) to provide a detection subsystem which detects the relative speed and relative distance between the vehicle itself and the hazardous object which might cause collision, and transmits the relative speed, relative spacing and other related information to the control subsystem;

(e) to provide a control subsystem which calculates the critical distance between the vehicle and the hazardous object and the critical speed of said vehicle itself, and decides whether or not to deploy the exterior airbag system and which exterior airbag to deploy;

(f) to provide a deployment subsystem which activates the exterior airbag(s) in the most efficient and effective way so as to avoid the collision or to reduce the degree of collision damages to the driver, passengers and the vehicle;

(g) to provide four types exterior airbags, including front, rear, side, and corner exterior airbags, and two types of installation/configuration combinations of exterior airbags;

(h) to provide two types of detection subsystems for detecting longitudinal collision for conventional highways and Automated Highway System, respectively;

(i) to provide the working process of the control subsystem;

(j) to provide two types of control methods to determine critical longitudinal distance $d_{cr}^{Lon}$ as a function of many factors, which is relative longitudinal speed $\Delta V^{Lon}$, longitudinal speed of concerned vehicle itself, vehicle friction factors, and other vehicle information;

(k) to provide a deployment subsystem which receives deployment instructions from the control subsystem and deploy exterior airbag(s);

(l) to provide closed exterior airbags and exhausted exterior airbags.

BRIEF DESCRIPTION OF THE DRAWINGS

The objects, features and functions of the present invention will become apparent from the detailed description of the preferred embodiments of the invention which follows, when considered in light of the accompanying drawings described in the following.

DETAILED DESCRIPTION OF THE PREFERRED EMBODIMENTS OF THE INVENTION

Figure 1:
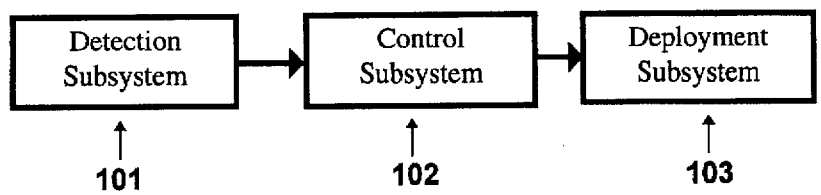
FIG. 1 shows the three components of a proactive exterior airbag system, comprising a detection subsystem, a control subsystem and a deployment subsystem.

The objective of this invention is to provide a proactive exterior airbag system, comprising a detection subsystem, a control subsystem and a deployment subsystem. This system is illustrated in FIG. 1. A detection subsystem 101 is to detect the relative speed and relative distance between the vehicle itself and the hazardous object which might cause collision. The detection subsystem will transmit the relative speed, relative spacing and other related information to the control subsystem. The control subsystem 102 will then calculate the critical distance between the vehicle and the hazardous object and the critical speed of the vehicle itself (critical distance and critical speed will be defined later). Based on the preset control method and the newly calculated critical distance and critical speed, the control subsystem will decide whether or not to deploy the proactive exterior airbag system and which exterior airbag(s) to deploy. If one or multiple exterior airbags are determined to be deployed, the deployment subsystem 103 will activate the exterior airbag(s) in the most efficient and effective way so as to avoid the collision or to reduce the degree of collision damages to the driver, passengers and the vehicles. The details of each of the subsystems will be discussed later.

Before the three subsystems are discussed, some important fundamentals will be investigated, including four types of proactive exterior airbags, two scenarios of longitudinal vehicle movement conflicts, and two scenarios of lateral vehicle movement conflicts.

Four Types of Proactive Exterior Airbags

Figure 2A:
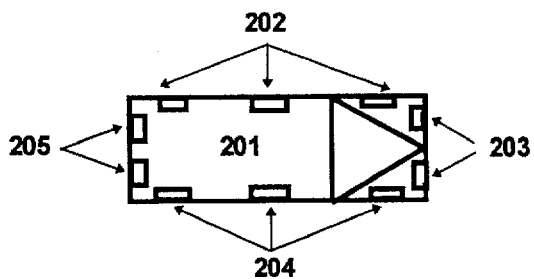
FIGS. 2A to 2D illustrate two combinations and configurations of four types of exterior airbags (front, rear, side, and corner).
Figure 2B:
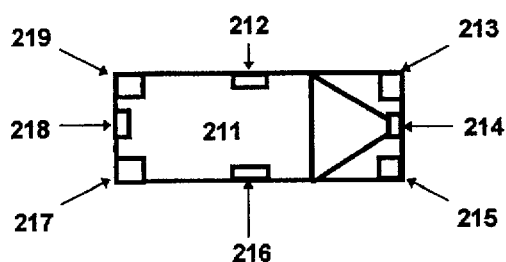

There are four types of proactive exterior airbags. Two possible combinations and configurations of these four types of exterior airbags are illustrated in FIGS. 2A-2B (top view) and FIGS. 2C-2D (side view). These proactive exterior airbags are defined as follows.

Figure 2D:
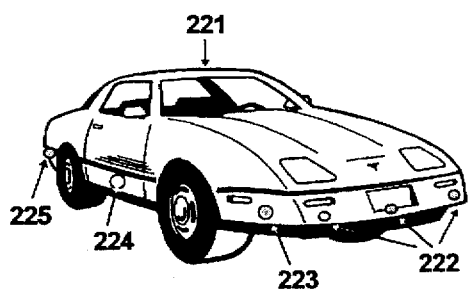
Figure 2C:
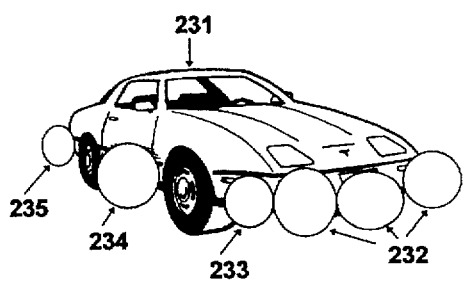

Front exterior airbag: 203 (FIG. 2A), 214 (FIG. 2B), 222 (FIG. 2C), 232 (FIG. 2D). There could be one or multiple front exterior airbags. This type of exterior airbag could be most widely used.

Rear exterior airbag: 205 (FIG. 2A), 218 (FIG. 2B). There could be one or multiple rear exterior airbags.

Side exterior airbags: 202/204 (FIG. 2A), 212/216 (FIG. 2B), 224 (FIG. 2C), 234 (FIG. 2D). This type of exterior airbag is more complicated. Its control subsystem and deployment subsystem will be disclosed in separate patents.

Corner airbags: 213/215/217/219 (FIG. 2B), 223/225 (FIG. 2C), 233/235 (FIG. 2D). This type of exterior airbag is more complicated. Its control subsystem and deployment subsystem will be disclosed in separate patents.

The front exterior airbag(s) will be installed on the front-bumper or in a hidden box in the front. When the vehicle detects a possible front-end collision, it will take a proactive protection measure (deploying front exterior airbag(s)) against the hazardous objects from the front.

The rear exterior airbag(s) will be installed on the rear-bumper or in a hidden box in the rear. When the vehicle detects a possible rear-end collision, it will take a proactive protection measure (deploying rear exterior airbag(s)) against the hazardous objects from the rear.

The side exterior airbag(s) will be installed on the side parts, such as doors, front side bumpers and rear side bumpers. When the vehicle detects a possible collision from one side, it will take a proactive protection measure (deploying side exterior airbag(s)) against the hazardous objects from the side.

The corner airbags will be installed at the four corners of the vehicle. When the vehicle detects a possible collision towards one corner(s), it will take a proactive protection measure (deploying corner exterior airbag(s)) against the hazardous objects towards the corner(s).

Under extreme circumstances when the vehicle is hit by objects from all directions, the above four types of proactive exterior airbags would be deployed and all the exterior airbags should be able to protect the vehicle, the driver and passengers.

Two Scenarios of Longitudinal Vehicle Movement Conflicts

Before detailed scenarios of vehicle movement conflicts are discussed, some notations of variables will be defined in the following.

$V_1^{Lon}$=longitudinal speed of vehicle 1;
$V_2^{Lon}$=longitudinal speed of hazardous vehicle/object 2;
$\Delta V^{Lon}=V_1^{Lon}-V_2^{Lon}$ (1003);
$V_1^{Lat}$=lateral speed of vehicle 1;
$V_2^{Lat}$=lateral speed of hazardous vehicle/object 2;
$\Delta V^{Lat}=V_1^{Lat}-V_2^{Lat}$;
$\Delta d^{Lon}$=longitudinal distance between vehicle 1 and hazardous vehicle/object 2 (303/403/503/604);
$\Delta d^{Lat}$=lateral distance between vehicle 1 and hazardous vehicle/object 2 (705/706);
$d_{cr}^{Lon}$=critical longitudinal distance under which front or rear exterior airbags might be deployed (1001);
$d_{cr}^{Lon}$=critical lateral distance under which side or corner exterior airbags might be deployed;
$V_{min}$=minimum speed under which it might not be necessary to deploy the exterior airbags.

Figure 3:
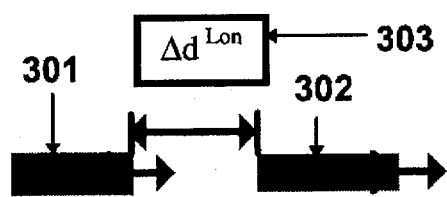
FIG. 3 shows that there are one vehicle and a hazardous vehicle/object moving forward in the same direction.

A. Same Direction Movement: As shown in FIG. 3, there are one vehicle and one hazardous vehicle/object moving forward. Both vehicle 1 (301) and hazardous vehicle/object 2 (302) are moving in the same direction. Both longitudinal speeds $V_1^{Lon}$ and $V_2^{Lon}$ are positive. The longitudinal collision between vehicle 1 and hazardous vehicle/object 2 is one of the most common movement conflicts.

In summary, for Scenario A, the following conditions hold:

$$\Delta V^{Lon}=V_1^{Lon}-V_2^{Lon}>0 \text{ and } V_1^{Lon}>0, V_2^{Lon}>0.$$

The determination method of critical longitudinal distance $d_{cr}^{Lon}$ for this scenario will be discussed later.

B. Opposite Direction Movement: As shown from FIGS. 4 to FIG. 6, one vehicle and a hazardous vehicles/object are moving in the opposite direction as shown in the following scenarios.

Figure 4:
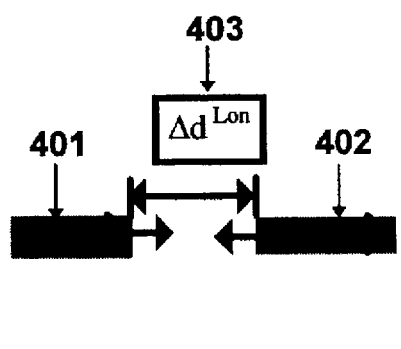
FIG. 4 shows that the leading hazardous vehicle/object 2 back toward the following vehicle 1.

B1. Vehicle Backing. The leading hazardous vehicle/object 2 (402) backs toward following vehicle 1 (401) as illustrated in FIG. 4. There is a possibility that the rear of hazardous vehicle/object 2 will have collision with the front of vehicle 1.

Figure 5:
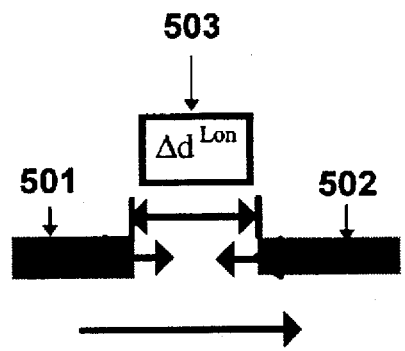
FIG. 5 shows that hazardous vehicle/object 2 is moving in the opposite direction (a possible heads-on collision).
Figure 6:
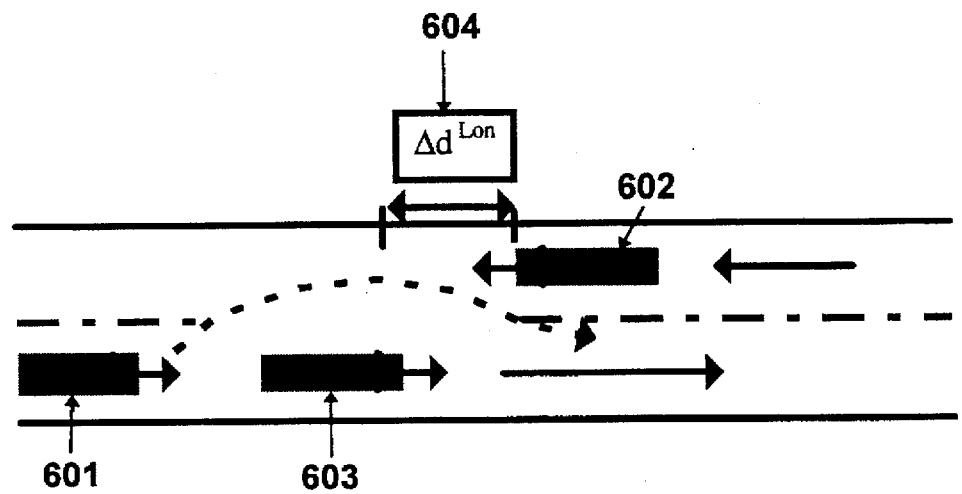
FIG. 6 shows that vehicle 1 is trying to overtake slow moving vehicle 3 when driving in the right direction on a two-lane highway. Hazardous vehicle/object 2 is moving on the other lane in the left direction. There is a possibility that vehicle 1 will have collision with hazardous vehicle/object 2.

B2. Moving In Wrong Way. Hazardous vehicle/object 2 (502) is moving in the wrong direction as illustrated in FIG. 5. This may happen on one-way street. There is a possibility that the front of hazardous vehicle/object 2 will have heads-on collision with the front of vehicle 1 (501).

B3. Overtaking on Two-Lane Highway. Vehicle 1 (601) is trying to overtake slow moving vehicle 3 (603) when driving in the right direction on a two-lane highway. Hazardous vehicle/object 2 (602) is moving on the other lane in the left direction. See FIG. 6. There is a possibility that the front of vehicle 1 will have heads-on collision with the front of hazardous vehicle/object 2.

In summary, for Scenario B, the following conditions hold:

$$\Delta V^{Lon}=V_1^{Lon}-V_2^{Lon}>0 \text{ and } V_1^{Lon}>0, V_2^{Lon}\leq 0.$$

The determination method of critical longitudinal distance $d_{cr}^{Lon}$ for this scenario will be the same as that for Scenario A.

Two Scenarios of Lateral Vehicle Movement Conflicts

Figure 7A:
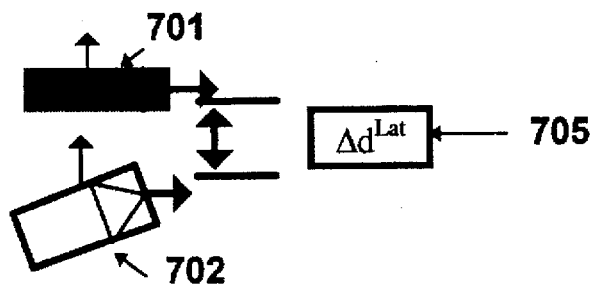
FIGS. 7A to 7B show that both vehicle 1 and hazardous vehicle/object 2 have lateral movements and may have collision with each other.
Figure 7B:
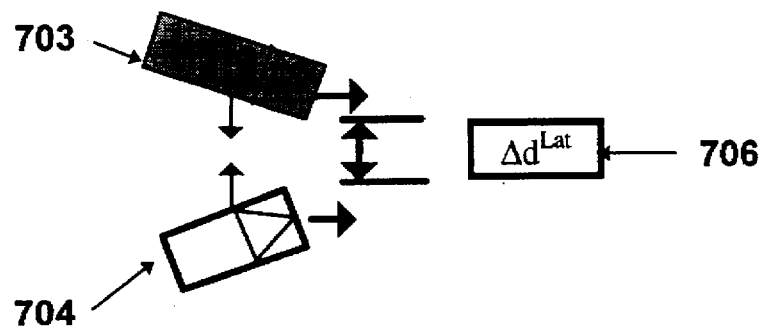

The lateral vehicle movement conflicts consist of side collision and corner collision. As illustrated in FIG. 7A, vehicle 1 (701) and hazardous vehicle/object 2 (702) have the same directional lateral movements. If hazardous vehicle/object 2 has higher lateral speed, it will possibly hit the right hand side or the rear-end corner of vehicle 1. As shown in FIG. 7B, vehicle 1 (703) and hazardous vehicle/object 2 (704) have the opposite lateral movements. Hazardous vehicle/object 2 will possibly hit the right hand side or a corner of vehicle 1. For the side exterior airbags and cornet airbags, the detection subsystem, control subsystem, and deployment subsystem will be disclosed in separate patents. Other types of lateral collision scenarios will be identified in separate patents and so do their corresponding detection subsystem, control subsystem, and deployment subsystem.

Detection Subsystem

The detection subsystem disclosed in the following is mainly used for detecting longitudinal collision. Similar method can be designed for lateral collision and will be disclosed in separate patents. The function of the detection subsystem is to detect possible hazardous object(s) for the vehicle itself and decide which object(s) have potential threats to the safety of the vehicle. It will detect relative longitudinal speeds $\Delta V^{Lon}$, actual spacing (or longitudinal distance) $\Delta d^{Lon}$ between the vehicle and the hazardous object(s). Then, it will calculate critical longitudinal distance $d_{cr}^{Lon}$.

Figure 8:
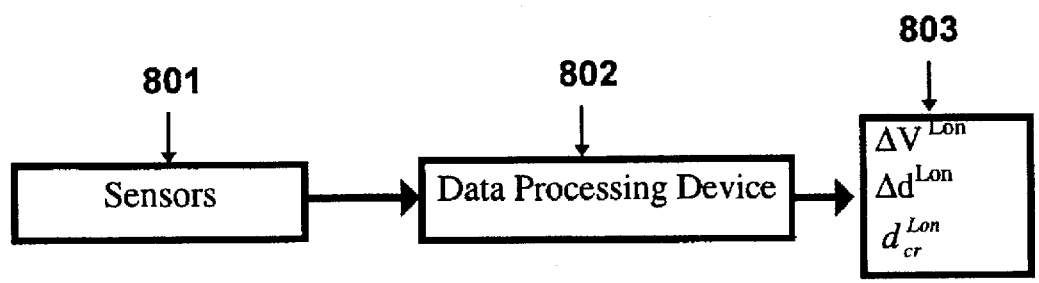
FIG. 8 illustrates the detection subsystem, which consists of sensors and data processing device.

The detection subsystem consists of sensors 801 and data processing device 802 as illustrated in FIG. 8. The example types of sensors include laser, radar, digital camera, vision, and infra-red, etc. Heat-sensors (or infra-red) can be used to detect operating vehicles. Laser-sensors can be used to detect static objects or any object in bad weather conditions. Radar sensors can be used to detect static or moving obstacles. The data processing device will utilize the information collected from sensors and calculate the critical longitudinal distance $d_{cr}^{Lon}$. Depending on types of highway systems, there are two methods to detect relative longitudinal speeds and actual spacing (or longitudinal distance), and to calculate critical longitudinal distance $d_{cr}^{Lon}$.

Conventional Highways

For conventional highways, conventional sensors are used to detect relative longitudinal speeds and actual spacing (or longitudinal distance) between the vehicle and the hazardous object(s). But different types of objects should be identified and classified, and this information would be transmitted to the control subsystem to make a decision regarding whether the hazardous object(s) are harmful enough so that the deployment of proactive exterior airbag is necessary. It will also be used for modification of the control method. For example, if the hazardous object is a moving animal, the parameters in the control method would be different from the case when the hazardous object is a truck.

The moving objects and static objects should be differentiated. If relative longitudinal speed between the vehicle and the hazardous object equals the actual speed of the vehicle, i.e., $$\Delta V^{Lon} = V_1^{Lon} - V_2^{Lon} = V_1^{Lon} \text{ and } V_2^{Lon} = 0,$$

the object is static. Otherwise, the object is moving. This information is important for the control subsystem to implement different control methods.

Automated Highway System (AHS)

In an Automated Highway System, the vehicle-to-vehicle communication device will inform the relative longitudinal speeds and actual spacing (or longitudinal distance) so that the vehicle itself can calculate critical longitudinal distance $d_{cr}^{Lon}$. For objects other than vehicles, the vehicle-to-roadside communication device will inform the relative longitudinal speeds and actual spacing (or longitudinal distance) so that it can calculate critical longitudinal distance $d_{cr}^{Lon}$ automatically. No additional detection device may be needed for an automated vehicle.

In an Automated Highway System, by detecting and checking vehicle path against the planned path, the detection subsystem can inform the control subsystem whether or not the exterior airbags should be activated. The major steps of implementation are as follows:

Step 1: If the automated vehicle path is consistent with the roadway and the planned path, no action is needed. Go to Step 4. If the vehicle path deviates the roadway and the planned path, go to Step 2.

Step 2: If the vehicle control computer can maneuver vehicle back to its normal path, no action is needed. Go to Step 4. If there is a failure in vehicle control computer and the automatic vehicle controller cannot maneuver the vehicle back to its normal path, go to Step 3.

Step 3: Deploy proactive exterior airbag system based on the control methods and deployment methods disclosed later.

Step 4: Resume normal automatic driving.

Control Subsystem

Figure 9:
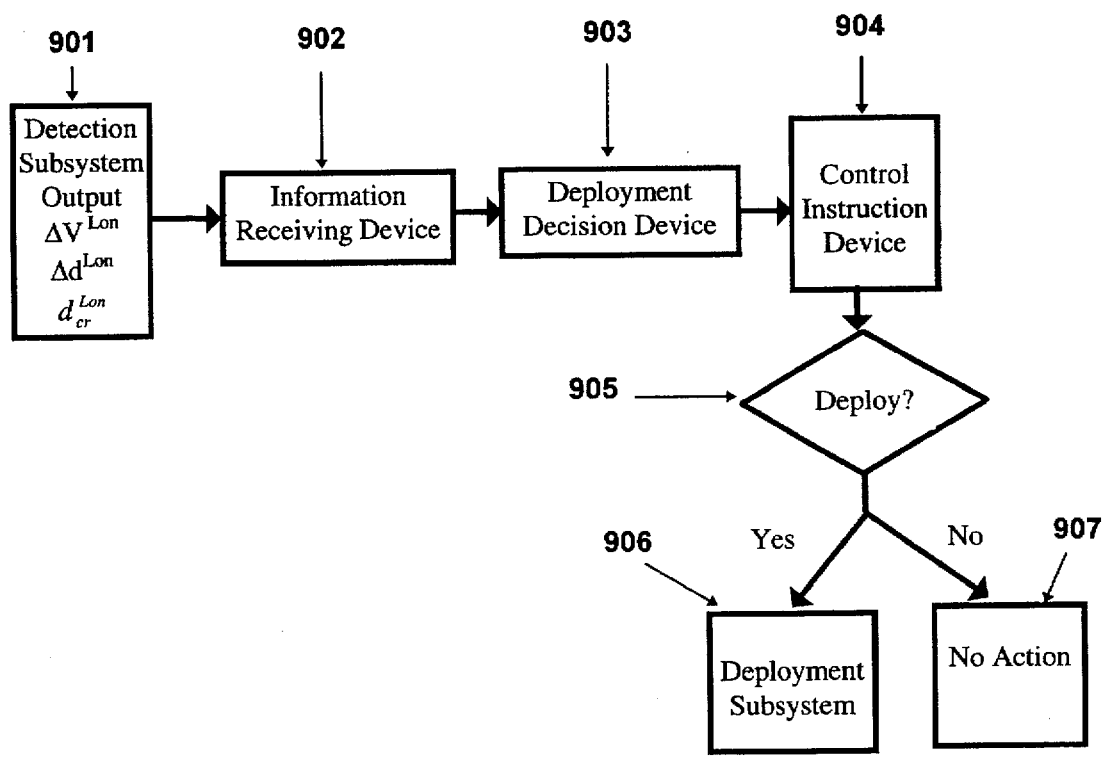
FIG. 9 illustrates the control subsystem and its working process.

The function of the control subsystem is to calculate the critical longitudinal distance and determine whether or not to deploy the exterior airbag. It will also determine which exterior airbag to deploy. As shown in FIG. 9, the control subsystem consists of an information receiving device 902, a deployment decision device 903, and a control instruction device 904. The information receiving device receives information from the detection subsystem 901 in terms of relative longitudinal speeds $\Delta V^{Lon}$, relative longitudinal distance $\Delta d^{Lon}$ and critical longitudinal distance $d_{cr}^{Lon}$. Then, the deployment decision device will use the control method (disclosed in the following) to determine which exterior airbag should be deployed to prevent the possible collision. Finally, the control instruction device will send out the deployment instructions and activate the deployment subsystem 906. For both conventional highways and Automated Highway System, the control subsystem and deployment subsystem have the similar working process and mechanism.

For the control subsystem, the control method is the key to determine when to deploy exterior airbag and which one to deploy. The control method disclosed here will mainly refer to the scenario when the vehicle deploys front exterior airbags. For scenario when the vehicle deploys rear exterior airbags, the control method is similar. But the parameters, such as critical longitudinal distance $d_{cr}^{Lon}$ and minimal speed $V_{min}$, need to be revised accordingly. The following discussion refers to FIG. 3.

Control Method for Scenario A—$V_1^{Lon} > 0$, $V_2^{Lon} \leq 0$

Step 1. If the relative longitudinal distance $\Delta d^{Lon} \geq d_{cr}^{Lon}$ (critical longitudinal distance), go to Step 2. Otherwise, go to Step 3.

Step 2. If the relative longitudinal speed $\Delta V^{Lon} > V_{min}$ (minimal relative speed), deploy exterior airbag(s). Otherwise, go to Step 3.

Step 3. No action is taken.

In Step 2, the no deployment situation is similar to parking maneuver of a vehicle in a parking facility. The usual speed is below 10–15 miles per hour in a parking facility. In such a situation, the minimal relative speed $V_{min}$ can be set as 10 miles per hour or defined by user requirements. If the relative longitudinal speed $\Delta V^{Lon} \leq V_{min}$, the vehicle is operating in a safe speed and the bumper can absorb the collision energy once a collision occurs. Therefore, there is no need to deploy the proactive exterior airbag. An extreme case is when relative longitudinal speed $\Delta V$ Lon=0 and relative longitudinal distance $\Delta d^{Lon} = 0$. In such a scenario, there is no collision and no damage to vehicle 1. No deployment of exterior airbags is needed.

Control Method for Scenario B—$V_1^{Lon} > 0$, $V_2^{Lon} < 0$

Step 1. If the relative longitudinal distance $\Delta d^{Lon} \leq d_{cr}^{Lon}$ (critical longitudinal distance), go to Step 2. Otherwise, go to Step 3.

Step 2. If the relative longitudinal speed $\Delta V^{Lon} > V_{min}$ (minimal relative speed), deploy exterior airbag(s). Otherwise, go to Step 3.

Step 3. No action is taken.

The major difference between the two control methods is the impact of relative speed. In the second method for scenario B, the relative speed is the summation of the speeds of the following vehicle and the hazardous vehicle/object. However, in the first method, the relative speed is the difference of the speeds of the following vehicle and the hazardous vehicle/object.

Determination of Minimal Speed $V_{min}$

The minimal speed $V_{min}$ is the speed or relative speed under which the proactive exterior airbags may not be necessary to be deployed. When the relative speed is under the minimal speed $V_{min}$, the bumper can absorb the collision energy once a collision occurs. The minimal speed can usually be set as 10 or 15 miles per hour. Depending on the situation, it can be adjusted accordingly.

Determination of Critical Longitudinal Distance $d_{cr}^{Lon}$

FIGS. 10A to 10D illustrate the relationship between various influencing factors and the critical longitudinal distance $d_{cr}^{Lon}$ 1001. The critical longitudinal distance $d_{cr}^{Lon}$ for the concerned vehicle 1 is a function of many factors, such as relative longitudinal speed $\Delta V^{Lon}$ 1003, longitudinal speed 1005 of concerned vehicle 1, vehicle friction factors 1009, breaking time 1013, and other vehicle information. In other words, we have the function:

$$d_{cr}^{Lon} = d_{cr}^{Lon}[\Delta V^{Lon}, V_1^{Lon}, \text{friction factors, breaking time, other vehicle information}]$$

The friction factors are mainly referred to the friction information between vehicle and pavement. Vehicle information consists of vehicle types, model, year, and equipment, etc. The most influencing factors consist of breaking distance, safety restraint equipment such as anti-lock breaking system (ABS) and road conditions (dry, wet, ice, snow, etc.). This critical longitudinal distance $d_{cr}^{Lon}$ must be calibrated for different vehicles by simulation and experiments.

Figure 10A:
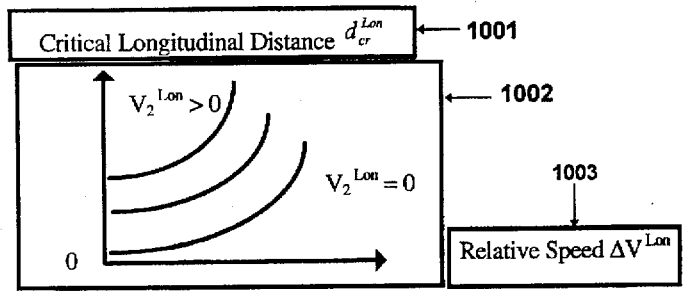
FIGS. 10A to 10D disclose the relationship between the influencing factors and the critical longitudinal distance $d_{cr}^{Lon}$.
Figure 10B:
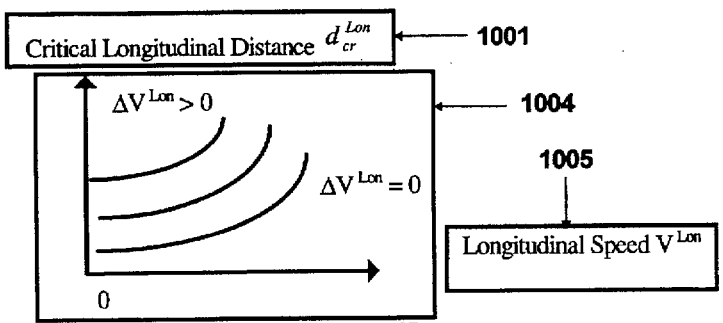
Figure 10C:
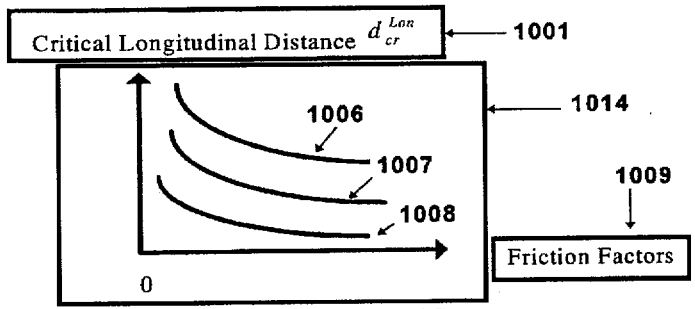
Figure 10D:
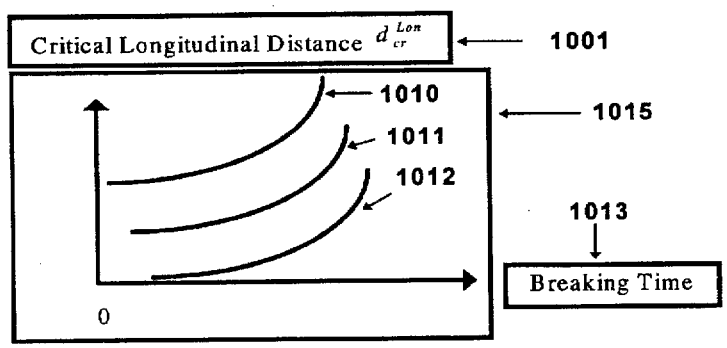

As shown in FIG. 10A, the critical longitudinal distance $d_{cr}^{Lon}$ increases when relative longitudinal speed $\Delta V^{Lon}$ increases. It also increases when vehicle speed itself increases (FIG. 10B). However, when friction increases, the critical longitudinal distance $d_{cr}^{Lon}$ decreases (FIG. 10C). For various types of vehicles (e.g., type I vehicle 1006, type II vehicle 1007, type III vehicle 1008), the relationships between friction and critical longitudinal distance $d_{cr}^{Lon}$ will be different. If the breaking time of vehicle is short, the critical longitudinal distance $d_{cr}^{Lon}$ can be short (FIG. 10D). Again, for various types of vehicles (e.g., type I vehicle 1010, type II vehicle 1011, type 1511 vehicle 1012), the relationships between breaking time and critical longitudinal distance $d_{cr}^{Lon}$ will be different. The road conditions and weather conditions will affect the critical longitudinal distance $d_{cr}^{Lon}$ mainly through the adjustment of friction factors. The exact format of the above equation will be disclosed in a separate patent.

Deployment Subsystem

Figure 11:
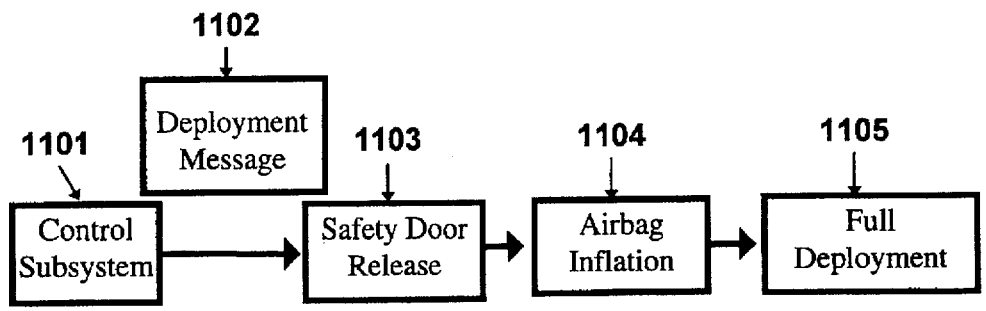
FIG. 11 shows the working process of the deployment subsystem.

The working process of the deployment subsystem is disclosed in FIG. 11. When the deployment subsystem receives deployment instructions 1102 from the control subsystem 1101, it will release the safety door(s) 1103 of the exterior airbag(s). Then, the airbag will be inflated 1104 and become a full-size airbag 1105 immediately. The exterior airbag will create extra friction with the pavement during the deployment so that it will release collision energy to the pavement and reduce the damage of collision.

Figure 13:
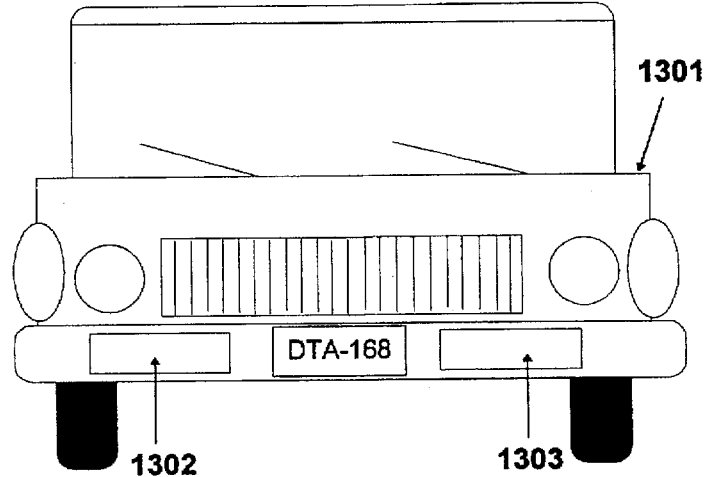
FIG. 13 shows the safety doors for exterior airbags.

The exterior airbag could be stored in a box embedded in the front bumper as illustrated in FIG. 2 and FIG. 13. If it is installed at the rear-end of the vehicle, it could be stored in the rear bumper. A safety door 1302/1303 is needed to ensure that the exterior airbag will not deploy under normal conditions.

Types of Exterior Airbags

Figure 12:
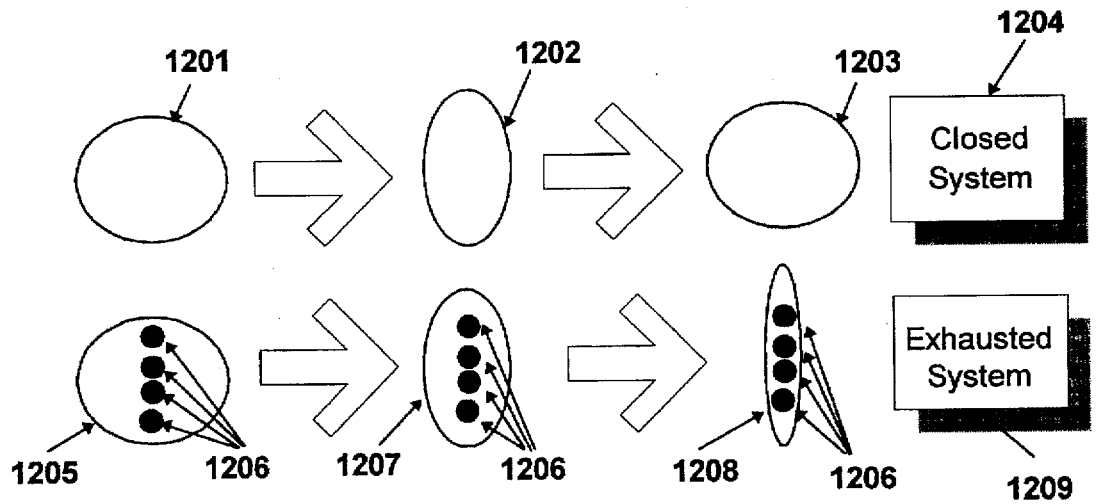
FIG. 12 illustrates the proactive deployment process of two types of exterior airbags.

As illustrated in FIG. 12, there are two types of exterior airbags: closed airbag 1204 and exhausted airbag 1209. FIG. 12 discloses the proactive deployment of two types of exterior airbags. The characteristics of two types of exterior airbags will be disclosed in the following.

1. Closed Airbag

The closed airbag works like a vehicle air suspension system. No air will be released from the airbag during collision (see FIG. 12). The closed airbag provides a layer of air buffer between the vehicle and the colliding object. The closed airbag will absorb most of the collision energy by deformation during the collision. Its function is similar to that of the suspension tires on the two sides of a ferry to avoid collision of the ferry with the pier when docking.

The closed airbag will deform during collision (experiencing initial stage 1201, compression 1202, and final stage 1203), and two colliding vehicles/objects will have no or little physical contacts. Thus, the closed airbag must be made of special material, such as thick rubber, in order to absorb the collision energy without exploding.

2. Exhausted Airbag

The exhausted airbag will release air from its pre-set holes 1206 (e.g., by using low speed air valves) after it is fully deployed (see FIG. 12). The exhausted airbag provides a layer of air buffer between the vehicle and the colliding object. But this layer of air will be exhausted through the special valves after a certain period of time (experiencing initial stage 1205, compression 1207, and final stage 1208). The exhausted airbag will deform gradually during collision and will absorb one part of the collision energy during the collision. It cannot fully prevent collision between two vehicles/objects, but it will reduce the collision severity significantly.

Recycle and Reinstallation of Exterior Airbag

A release button can be used to release deployed exterior airbag(s) after collision occurs. FIG. 13 discloses the safety door design 1302/1303 for the proactive exterior airbags. The deployed exterior airbag(s) can be recycled easily and quickly. Subsequently, new exterior airbag(s) can be reinstalled on the vehicle.

What is claimed is:

1. A proactive exterior airbag system, comprising:
    (a) a detection subsystem to detect said relative speed and said relative distance between said vehicle itself and said hazardous object which might cause collision, and to transmit said relative speed, said relative space and other related information to said control subsystem,
    (b) a control subsystem to calculate said critical spacing between said vehicle and said hazardous object, said decision point, and said critical speed of said vehicle itself, and to decide whether or not to deploy said exterior airbag system and which exterior airbag(s) to deploy,
    (c) a deployment subsystem to activate said exterior airbag(s) in the most efficient and effective way so as to avoid said collision or to reduce said degree of collision damages to passengers and vehicles.

2. The proactive exterior airbag system according to claim 1, further comprising,
    four types of exterior airbags (front, rear, side, and corner exterior airbags),
    two types of installation and configuration methods of exterior airbags, where in type I installation and configuration method, a combination of front, rear, and side exterior airbags is used, and said front, rear, and side exterior airbag system could have one or multiple airbags on each side (front, rear, left-side, right-side) depending on the necessity of protection,
    in type II installation and configuration method, a combination of front, rear, corner, and side exterior airbags is used, and said front, rear, corner, and side exterior airbag system could have one or multiple airbags on each side or direction (front, rear, left-front corner, right-front corner, rear-left corner, rear-right corner, left-side, right-side) depending on the necessity of protection.

3. The proactive exterior airbag system according to claim 1, further comprising two types of detection subsystems for detecting longitudinal collision, where
    in type I detection subsystem for conventional vehicles and conventional highways, conventional sensors or detection devices such as radar, laser, infrared, microwave, are used on conventional highways to detect relative speeds and distance or spacing between said vehicle and said hazardous object(s),
    in type II detection subsystem for Automated Highway System, vehicle-to-vehicle and vehicle-to-roadside communication devices are used to inform said relative speeds and distance or spacing so that said vehicle itself can calculate critical distance $d_{cr}^{Lon}$ and decision point for deploying said proactive exterior airbag system.

4. The detection subsystem of claim 1, wherein, by detecting and checking said vehicle path against said planned path for said automated vehicle, said detection subsystem in an Automated Highway System can inform said control subsystem regarding whether or not said proactive exterior airbag system should be activated.

5. The detection subsystem for Automated Highway System according to claim 1, wherein said detection subsystem uses said detection method which comprises the steps of:

(a) if said automated vehicle path being consistent with said roadway and said planned path, no action being needed and going to step (d); if said vehicle path deviating said roadway and said planned path, going to step (b);

(b) if said vehicle control computer being able to maneuver vehicle back to normal path, no action being needed and going to step (d); if there being a failure in said vehicle control computer and said automatic vehicle controller being unable to maneuver said vehicle back to its normal path, going to step (c);

(c) deploying said proactive exterior airbag system based on said control methods and said deployment methods;

(d) resuming normal automatic driving.

6. The control subsystem according to claim 1, wherein the function of said control subsystem is to calculate said critical relative distance (or spacing) and relative speed, to determine whether or not to deploy said proactive exterior airbag(s), and to determine which proactive exterior airbag(s) to deploy.

7. The control subsystem according to claim 1, further comprising an information receiving device which receives information from said detection subsystem in terms of relative speeds, relative distance, and critical distance or spacing, a deployment decision device which uses said control method to determine which proactive exterior airbag should be deployed to prevent said possible collision, a control instruction device which sends out said deployment instructions and activates said deployment subsystem.

8. The control subsystem according to claim 1, wherein said working process and mechanism apply for both conventional highway system and Automated Highway System, said working process and mechanism have to be used by said vehicle in conventional highway system, and said working process and mechanism could be used by either said vehicle or said highway or both in Automated Highway System.

9. The control subsystem to activate said proactive front exterior airbags for longitudinal collision prevention according to claim 1, wherein, if said vehicle follows said hazardous vehicle or object in the same movement direction (said following vehicle speed $V_1^{Lon}>0$ and said leading hazardous vehicle or object speed $V_2^{Lon}\geq 0$), said control subsystem uses a control method, which comprises the steps of:

(a) if said relative longitudinal distance or spacing $\Delta d^{Lon}$ is smaller than or equal to said critical longitudinal distance $d_{cr}^{Lon}$, going to step (b); otherwise, going to step (c);

(b) if said relative longitudinal speed $\Delta V^{Lon}$ between said following vehicle and said leading hazardous object is greater than minimum speed $V_{min}$ (usually 10 miles per hour or defined by said user), deploying said proactive front exterior airbag(s); otherwise, going to step (c);

(c) no action being taken.

10. A control subsystem to activate said proactive front exterior airbags for heads-on longitudinal collision prevention according to claim 1, wherein, if said vehicle moves against said hazardous vehicle or object (said vehicle speed $V_1^{Lon}>0$ and said hazardous vehicle or object moving in opposite direction with speed $V_{2\ Lon}<0$), said vehicle uses a control method, which comprises the steps of:

(a) if said relative longitudinal distance or spacing $\Delta d^{Lon}$ is smaller than or equal to said critical longitudinal distance $d_{cr}^{Lon}$, going to step (b); otherwise, going to step (c);

(b) if said relative longitudinal speed $\Delta V^{Lon}$ between said vehicle and said hazardous object is greater than minimum speed $V_{min}$ (usually 10 miles per hour or defined by said user), deploying said proactive front exterior airbag(s); otherwise, going to step (c);

(c) no action being taken.

11. The control subsystem according to claim 1, wherein said determination method of critical relative longitudinal distance $d_{cr}^{Lon}$ used in said control subsystem for said vehicle is a function of many factors, such as relative longitudinal speed $\Delta V^{Lon}$, longitudinal speed of said vehicle, vehicle friction factors, and other vehicle information.

12. The control subsystem according to claim 1, wherein said friction factors used in said control method by said control subsystem are mainly referred to the vehicle/pavement friction information and road conditions (dry, wet, ice, snow); said vehicle information consists of vehicle types, model, year, breaking capability, safety restraint equipment such as anti-lock breaking system, and other information; said critical distance $d_{cr}^{Lon}$ must be calibrated for different vehicles by simulation and experiments.

13. The control subsystem according to claim 1, wherein said critical longitudinal distance $d_{cr}^{Lon}$ used in said control method by said control subsystem increases when said relative speed $\Delta V^{Lon}$ increases, said critical distance $d_{cr}^{Lon}$ increases when said vehicle speed itself increases, said critical distance $d_{cr}^{Lon}$ decreases when friction increases, said critical distance $d_{cr}^{Lon}$ decreases if the breaking time of the vehicle decreases, said critical distance $d_{cr}^{Lon}$ will be affected by said road conditions and weather conditions mainly through the adjustment of said friction factors.

14. The control subsystem according to claim 1, wherein said minimal speed or minimal relative speed $V_{min}$ used in said control method by said control subsystem is the speed or relative speed under which said proactive exterior airbag(s) may not be necessary to be deployed and said bumper can absorb said collision energy once a collision occurs, and said minimal speed can usually be set as 10 or 15 miles per hour and can be adjusted accordingly depending on said situation and user requirements.

15. The deployment subsystem according to claim 1, wherein said working process of said deployment subsystem is to receive deployment instructions from said control subsystem, to release said safety door(s) of said proactive exterior airbag(s), to be inflated, and to become a full-size airbag immediately.

16. A closed exterior airbag according to claim 1, wherein no air will be released from said closed exterior airbag during collision, a layer of air buffer is provided between said vehicle and said colliding object, said closed exterior airbag works like a vehicle air suspension system, most of said collision energy during said collision could be absorbed by said closed exterior airbag, said closed exterior airbag will deform during collision and two colliding vehicles or objects will have no or little physical contacts, and said closed exterior airbag must be made of special material, such as thick rubber, in order to absorb collision energy without exploding.

17. An exhausted exterior airbag according to claim 1, wherein air will be released from its pre-set holes after said exhausted exterior airbag is fully deployed, a layer of air buffer is provided between said vehicle and said colliding object, said layer of air will be exhausted through said special valves after a certain period of time, said exhausted exterior airbag will deform gradually during collision and will absorb one part of said collision energy during said collision, said exhausted exterior airbag cannot fully prevent collision between two vehicles, but said exhausted exterior airbag will reduce said collision severity significantly.

18. A recycle and reinstallation method of proactive exterior airbag according to claim, wherein said deployed exterior airbag can be recycled easily by using a release button and a new exterior airbag will be reinstalled.

* * * * *